(12) United States Patent
Savoor et al.

(10) Patent No.: US 9,729,909 B2
(45) Date of Patent: **\*Aug. 8, 2017**

(54) METHOD AND SYSTEM FOR MEDIA ADAPTION

(71) Applicant: AT&T INTELLECTUAL PROPERTY I, LP, Atlanta, GA (US)

(72) Inventors: Raghvendra Savoor, Walnut Creek, CA (US); Zhi Li, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,111

(22) Filed: May 10, 2016

(65) Prior Publication Data

US 2016/0255385 A1 Sep. 1, 2016

Related U.S. Application Data

(63) Continuation of application No. 12/754,749, filed on Apr. 6, 2010, now Pat. No. 9,363,572, which is a
(Continued)

(51) Int. Cl.
*H04N 7/173* (2011.01)
*H04N 21/2662* (2011.01)
(Continued)

(52) U.S. Cl.
CPC ........ *H04N 21/2662* (2013.01); *H04H 20/28* (2013.01); *H04L 12/2801* (2013.01); *H04L 29/06* (2013.01); *H04L 29/06462* (2013.01); *H04L 29/06523* (2013.01); *H04L 29/0809* (2013.01); *H04L 29/08072* (2013.01); *H04L 29/08144* (2013.01); *H04L 41/12* (2013.01); *H04L 63/08* (2013.01); *H04N 5/4401* (2013.01); *H04N 7/173* (2013.01); *H04N 7/17309* (2013.01); *H04N 7/17318* (2013.01); *H04N 7/17336* (2013.01); *H04N 7/17354* (2013.01); *H04N 21/2343* (2013.01); *H04N 21/2393* (2013.01); *H04N 21/234309* (2013.01);
(Continued)

(58) Field of Classification Search
None
See application file for complete search history.

(56) References Cited

U.S. PATENT DOCUMENTS 5,953,506 A \* 9/1999 Kalra .................... G06T 3/4092
345/428
6,223,292 B1 4/2001 Dean et al.
(Continued)

*Primary Examiner* — Jonathan V Lewis
(74) *Attorney, Agent, or Firm* — Guntin & Gust, PLC; Joseph Hrutka

(57) ABSTRACT

A method includes receiving a media request for a target device. The signaling information may be received from the target device and a media server. At least one attribute of the target device and the media server may be identified using the signaling information. At least one attribute of the target device and the media server may be evaluated against a service level objective to select a media format. The service level objective may include consideration of the target device and available bandwidth over a provider network. The media may be provided in the selected media format over the provider network to the target device.

20 Claims, 7 Drawing Sheets

Related U.S. Application Data continuation of application No. 11/844,692, filed on Aug. 24, 2007, now Pat. No. 7,720,986.

(51) Int. Cl.

| | | |
|---|---|---|
| *H04L 12/28* | (2006.01) | |
| *H04L 29/08* | (2006.01) | |
| *H04L 12/24* | (2006.01) | |
| *H04H 20/28* | (2008.01) | |
| *H04L 29/06* | (2006.01) | |
| *H04N 5/44* | (2011.01) | |
| *H04N 21/2343* | (2011.01) | |
| *H04N 21/24* | (2011.01) | |
| *H04N 21/258* | (2011.01) | |
| *H04N 21/6377* | (2011.01) | |
| *H04N 21/658* | (2011.01) | |
| *H04N 21/239* | (2011.01) | |

(52) U.S. Cl.
CPC .. *H04N 21/234363* (2013.01); *H04N 21/2402* (2013.01); *H04N 21/25816* (2013.01); *H04N 21/25825* (2013.01); *H04N 21/25891* (2013.01); *H04N 21/6377* (2013.01); *H04N 21/658* (2013.01); *H04N 21/6582* (2013.01)

(56) References Cited

U.S. PATENT DOCUMENTS

| | | | | |
|---|---|---|---|---|
| 6,738,353 | B2* | 5/2004 | Chong | H04L 12/2602 370/241 |
| 6,763,226 | B1 | 7/2004 | McZeal et al. | |
| 6,917,628 | B2 | 7/2005 | McKinnin et al. | |
| 7,024,680 | B2* | 4/2006 | Howard | H04L 1/0006 455/423 |
| 7,061,920 | B2* | 6/2006 | Janko | H04L 12/2697 348/E17.003 |
| 7,159,235 | B2* | 1/2007 | Son | H04L 12/2801 348/E5.008 |
| 7,295,960 | B2* | 11/2007 | Rappaport | G06F 17/509 455/403 |
| 7,310,672 | B2 | 12/2007 | Rolia | |
| 7,359,971 | B2* | 4/2008 | Jorgensen | H04L 1/20 370/328 |
| 7,363,384 | B2 | 4/2008 | Chatani et al. | |
| 7,756,136 | B2* | 7/2010 | Mohandas | H04L 12/1868 370/395.64 |
| 7,764,608 | B2* | 7/2010 | Breynaert | H04N 21/23406 370/230 |
| 7,843,842 | B2* | 11/2010 | Ethier | H04L 12/2602 370/248 |
| 8,046,815 | B2* | 10/2011 | Kim | H04N 7/22 725/116 |
| 8,189,472 | B2 | 5/2012 | McDonald et al. | |
| 8,855,469 | B2* | 10/2014 | Maharajh | G06F 17/30035 386/205 |
| 2002/0112097 | A1 | 8/2002 | Milovanovic et al. | |
| 2002/0147759 | A1 | 10/2002 | Ranganathan et al. | |
| 2002/0178277 | A1* | 11/2002 | Laksono | H04N 7/17318 709/231 |
| 2003/0069963 | A1* | 4/2003 | Jayant | H04L 29/06027 709/224 |
| 2003/0097443 | A1 | 5/2003 | Gillett et al. | |
| 2003/0177269 | A1* | 9/2003 | Robinson | H04L 41/12 709/246 |
| 2003/0236904 | A1* | 12/2003 | Walpole | H04L 12/1881 709/231 |
| 2004/0045030 | A1* | 3/2004 | Reynolds | H04L 29/06 725/110 |
| 2005/0190794 | A1* | 9/2005 | Krause | H04L 29/06027 370/485 |
| 2005/0289618 | A1 | 12/2005 | Hardin | |
| 2006/0085534 | A1* | 4/2006 | Ralston | H03M 7/40 709/223 |
| 2006/0167940 | A1 | 7/2006 | Colton et al. | |
| 2006/0171390 | A1 | 8/2006 | La Joie | |
| 2008/0120675 | A1 | 5/2008 | Morad et al. | |
| 2008/0201748 | A1* | 8/2008 | Hasek | H04N 7/17309 725/98 |
| 2009/0031384 | A1* | 1/2009 | Brooks | H04N 21/23439 725/127 |
| 2010/0167816 | A1 | 7/2010 | Perlman et al. | |
| 2010/0260259 | A1* | 10/2010 | Kimmich | H04L 1/0003 375/240.07 |
| 2013/0205329 | A1* | 8/2013 | Markley | H04L 12/2803 725/25 |

* cited by examiner

METHOD AND SYSTEM FOR MEDIA ADAPTION

CROSS REFERENCE TO RELATED APPLICATIONS

The present application claims the benefit of priority to and is a continuation of U.S. patent application Ser. No. 12/754,749, filed Apr. 6, 2010, which is a continuation of U.S. patent application Ser. No. 11/844,692 filed on Aug. 24, 2007, now U.S. Pat. No. 7,720,986, which are hereby incorporated herein by reference in their entirety.

FIELD

This application relates to a method and system for processing media, and more specifically to methods and systems for media adaptation.

BACKGROUND

A user that seeks to receive media (e.g., a video signal or other data) on a target device from a server may have limited options. The user maybe able to specify to the server a format of the media or a bandwidth of the media to be received. However, a number of factors related to providing the media to the target device may be beyond the control and/or outside of the knowledge of the user that has specified the format or bandwidth. The user may be inconvenienced or otherwise dissatisfied because the delivery time of the media may be unreasonable, the media may be of too poor quality for the device, the media may require significant processed by the target device, or the experience may otherwise be unsatisfactory.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for image alteration are described. In the following description, for purposes of explanation, numerous specific details are set forth in order to provide a thorough understanding of example embodiments. It will be evident, however, to one skilled in the art that the present invention may be practiced without these specific details.

In an example embodiment, a media request may be received for a target device. Signaling information may be received from the target device and a media server. At least one attribute of the target device and the media server may be identified using the signaling information. At least one attribute of the target device and the media server may be evaluated against a service level objective to select a media format. The service level objective may include consideration of the target device and available bandwidth over a provider network. The media may be provided in the selected media format over the provider network to the target device.

In an example embodiment, signaling information from a target device and a media server may be received. A media request may be received from the target device. At least one attribute of the target device and the media server may be identified using the signaling information. At least one attribute of the target device and the media server may be evaluated against a service level objective to select a media format. The service level objective may include consideration of the target device and available bandwidth over a provider network. The media may be provided in the selected media format over the provider network to the target device.

Figure 1:
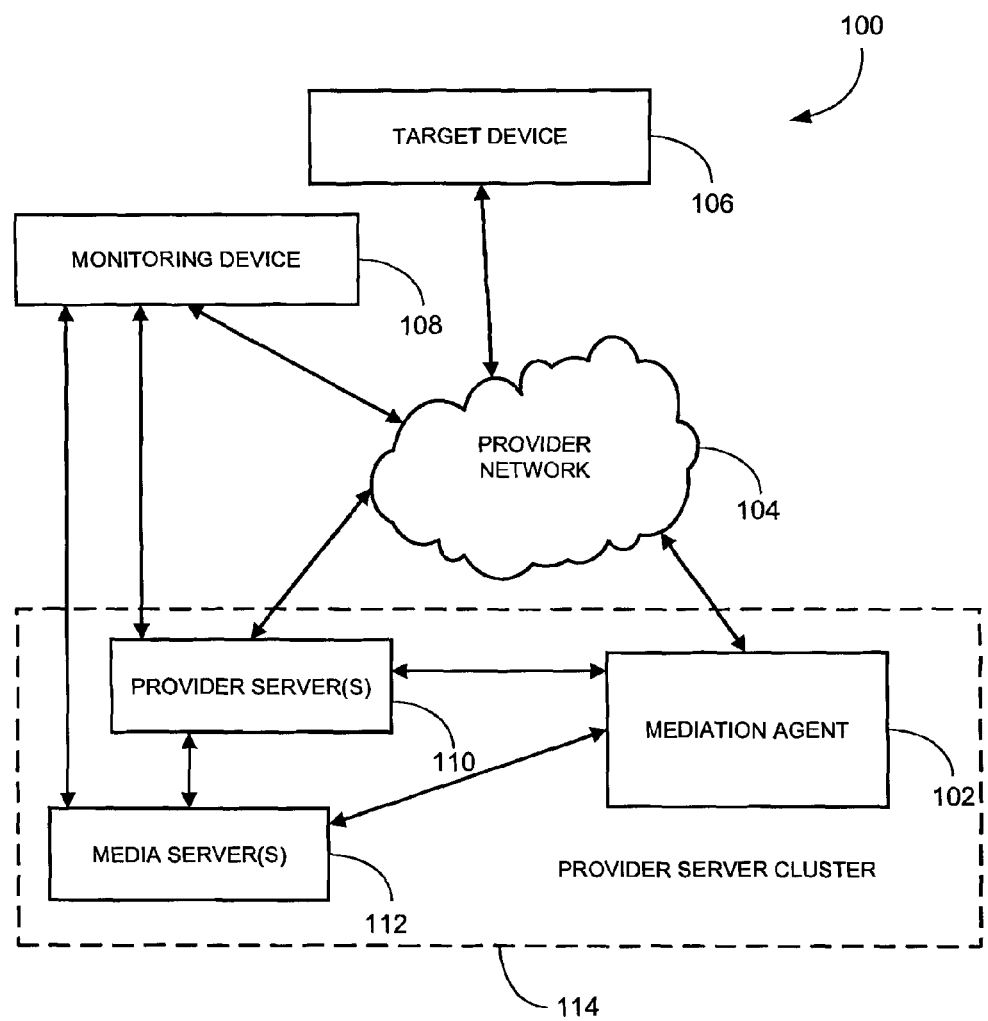
FIGS. 1 and 2 are block diagrams of example media systems according to an example embodiment.

FIG. 1 illustrates an example media system 100 in which a mediation agent 102 may receive signaling information from a media server 112 and a target device 106 and provide media from the media server 112 over a provider network 104 to the target device 106. An example embodiment of the mediation agent 102 is described in greater detail below.

The media may include text data, document data, video data, image data, and/or voice data. Other types of media may also be used. By way of an example, the video signal may be a sequence of images and one or more associated audio tracks. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies and commercials.

The provider network 104 over which the media may be provided may include a television distribution network, Global System for Mobile Communications (GSM) network, an Internet Protocol (IP) network, a Wireless Application Protocol (WAP) network, and/or a Wifi network. Other networks may also be used.

The target device 106 may be a set-top box (STB), a television monitor, a mobile telephone, a portable gaming device, a personal digital assistant (PDA), a computer system, a receiver card, a portable media player, and the like. Other types of target devices may also be used.

The monitoring device 108 may monitor signaling information between the media server 112, the provider server 110 and/or the target device 106. The monitoring device 108 may then provide the signaling information to the provider server 110 and/or the mediation agent 102. The signaling information may be used to determine one or more attributes of corresponding servers and/or devices.

One or more provider servers 110 may be used by a provider to interact with a user and provide non-media related services to the user. The provider server 110 may, by way of example, be used to authenticate the target device 106 for receiving media from the media server 112. The provider server 110, the media servers 112 and/or the mediation agent 102 may optionally be grouped together in a provider server cluster 114 or otherwise associated.

Figure 2:
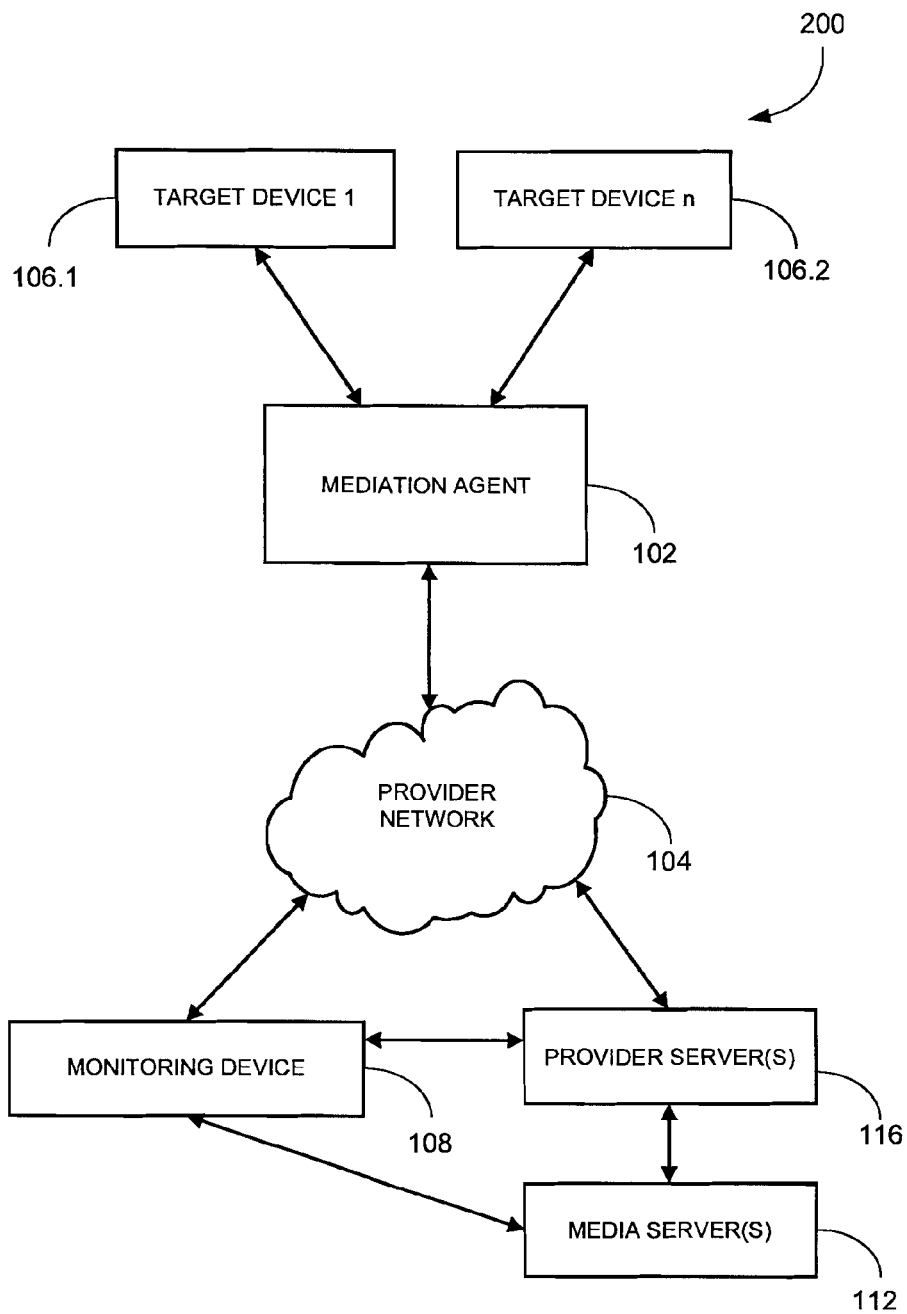

FIG. 2 illustrates an example media system 200. The mediation agent 102 may provide the signaling information between a number of target devices 106.1-106.n and the media servers 112 and provide the media to the target devices 106.1-106.n from the media server 112.

Figure 3:
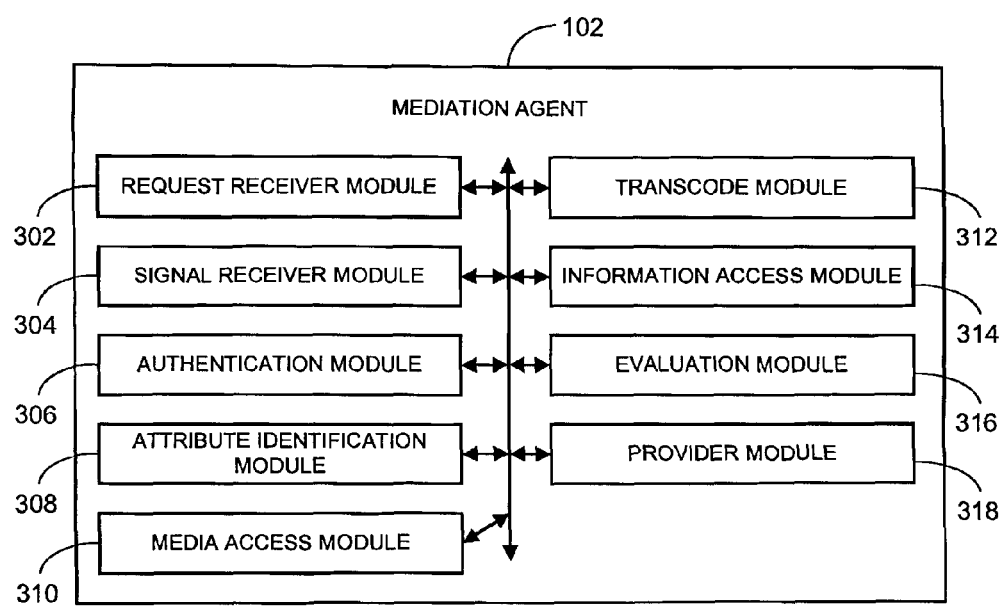
FIG. 3 is a block diagram of an example mediation agent that may be deployed in the media systems of FIG. 1 or FIG. 2 according to an example embodiment.

FIG. 3 illustrates an example mediation agent 102 that may be deployed in the media system 100, the media system 200, and/or another system (see FIGS. 1 and 2).

The mediation agent 102 may include a request receiver module 302, a signal receiver module 304, an authentication module 306, an attribute identification module 308, a media access module 310, a transcode module 312, an information access module 314, an evaluation module 316, and/or a provider module 318. Other modules may also be used.

The request receiver module 302 receives a media request for the target device 106. The signal receiver module 304 receives signaling information from the target device 106 and the media server 112. The signaling information may be exchanged between the target device 106 and the media server 112 when received by the signal receiver module 304.

The authentication module 306 receives a notification of authentication of the target device 106 by the provider server 110. The attribute identification module 308 identifies one or more attributes of the target device 106 and the media server 112 using the signaling information.

The media access module 310 accesses the media of a source media format from the media server 112. The media may be accessed from a number of available formats of the media. The transcode module 312 transcodes the media from the source media format to a selected media format. The information access module 314 accesses user information related to the media format from the provider server 110.

The evaluation module 316 evaluates the attributes of the target device 106 and the media server 112 against a service level objective to select a media format. The service level objective may include consideration of the target device 106 and available bandwidth over the provider network 104. The service level objective may further include the target device 106 receiving the media over the provider network 104 within a predetermined period of time at presentation quality on the target device 106. The provider module 318 provides the media in the selected media format over the provider network 104 to the target device 106.

Figure 4:
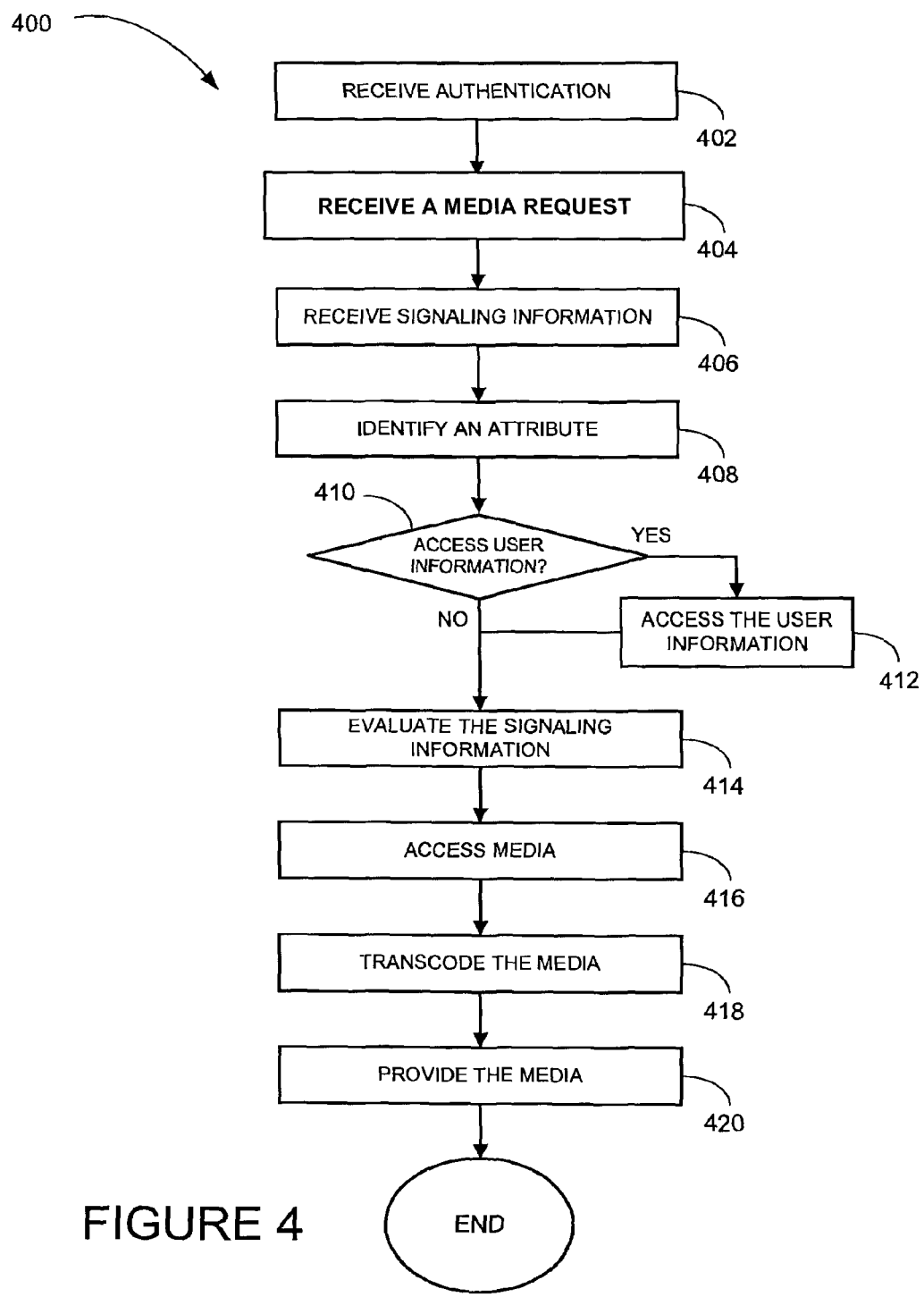
FIGS. 4 and 5 are a flowcharts illustrating a method for providing media in accordance with an example embodiment.

FIG. 4 illustrates a method 400 for providing media according to an example embodiment. The method 400 may be performed by the mediation agent 102 in the media system 100, the media system 200, and/or in otherwise performed.

A notification of authentication of the target device 106 by the provider server 110 may be received at block 402. For example, the provider server 110 may provide the notification when a user has entered in a user name and password or otherwise provided authentication to the provider server 110.

A media request is received for the target device 106 at block 404. For example, the user of the target device may notify the provider server 110 (e.g., through a user interface or through the target device 106) or a desire for certain media. The provider server 110 may provide the media request for the target device 106 as a result, or the request sent to the provide server 110 may be obtained as the media request. Other ways of receiving media requests may also be used.

Signaling information is received from the target device 106 and the media server 112 at block 406. In an example embodiment, an exchange of signaling information between the target device 106 and the media server 112 may be initiated and the signaling information exchanged between the target device 106 and the media server 112 may be received. The signaling information may use a variety of protocols including Hypertext Transfer Protocol (HflP), Secure Hypertext Transfer Protocol (HTTPS), Real Time Control Protocol (RTCP), and other various application layer protocols. Other types of existing or future developed signaling protocols may also be used.

One or more attributes of the target device 106 and the media server 112 is identified using the signaling information at block 408. The signaling information may enable dynamic verification of the one or more attributes of the target device 106 and/or the media server 112. For example, if the target device 106 of the user is replaced, or additional bandwidth becomes available on the provider network 104, the signaling information may be used to determine the changes so that the media may be provided taking into consider the changes.

The one or more attributes of the media server 112 may include available bandwidth on the provider network 104 from the media server 112 and/or a packet impairment characteristic of a media delivery path over the provider network 104. Other attributes of the media server 112 may also be identified.

The one or more attributes from the target device 106 may include an existing media resolution presentable by the target device 106, a feature (e.g., sound capability, network capability, or storage capacity) of the target device 106, a decoding capability of the target device 106, one or more available resources of the target device 106, a cost of delivery of the media from the media server 112 to the target device 106, a time of delivery of the media from the media server 112 to the target device 106, a subscriber history of a user associated with the target device 106, and/or available bandwidth on the provider network 104 to the target device. Other attributes of the target device 106 may also be identified.

A determination may be made at decision block 410 whether to access user information of a user associated with the target device 106. If a determination is made to access the user information, the user information may be accessed from the provider server 110 at block 412. The accessed user information may include, by way of example, an ordering history of a user, a viewing history of the user, a user preference of the media format, and the like. Other types of user information may also be accessed. If a determination is made not to access the user information at decision block 410 or upon completion of the operations at block 412, the method 400 may proceed to block 414.

At block 414, the one or more attributes of the target device 106 and the media server 112 and optionally the user information are evaluated against a service level objective to select a media format. The service level objective may include consideration of the target device 106 and available bandwidth over the provider network 104.

The media may be adapted by selecting a media format that will enable the target device 106 to receive the media at a sufficient quality in a determined period of time. In an example embodiment, evaluating against the service level objective may enable the target device 106 to receive data in a reasonable period of time (e.g., a guaranteed time) for the user while maintaining quality of the media. By way of an example, a user downloading a video signal to a PDA under limited bandwidth may receive the video signal in a selected format that has been optimized for speed of delivery and a relative resolution of the decoder. The same user downloading the same video signal to high resolution device with a high speed network connection may receive the video signal in a selected format that has been optimized for a higher quality video signal than the video signal received by the PDA without a significant compromise of download time.

The media of a source media format may be accessed from the media server 112 at block 416. The media server 112 may include a single media format or a number of available media formats. The media of the source media format may be transcoded at block 418.

The media is provided in the selected media format (e.g., as accessed or as transcoded) over the provider network 104 to the target device 106 at block 420.

Figure 5:
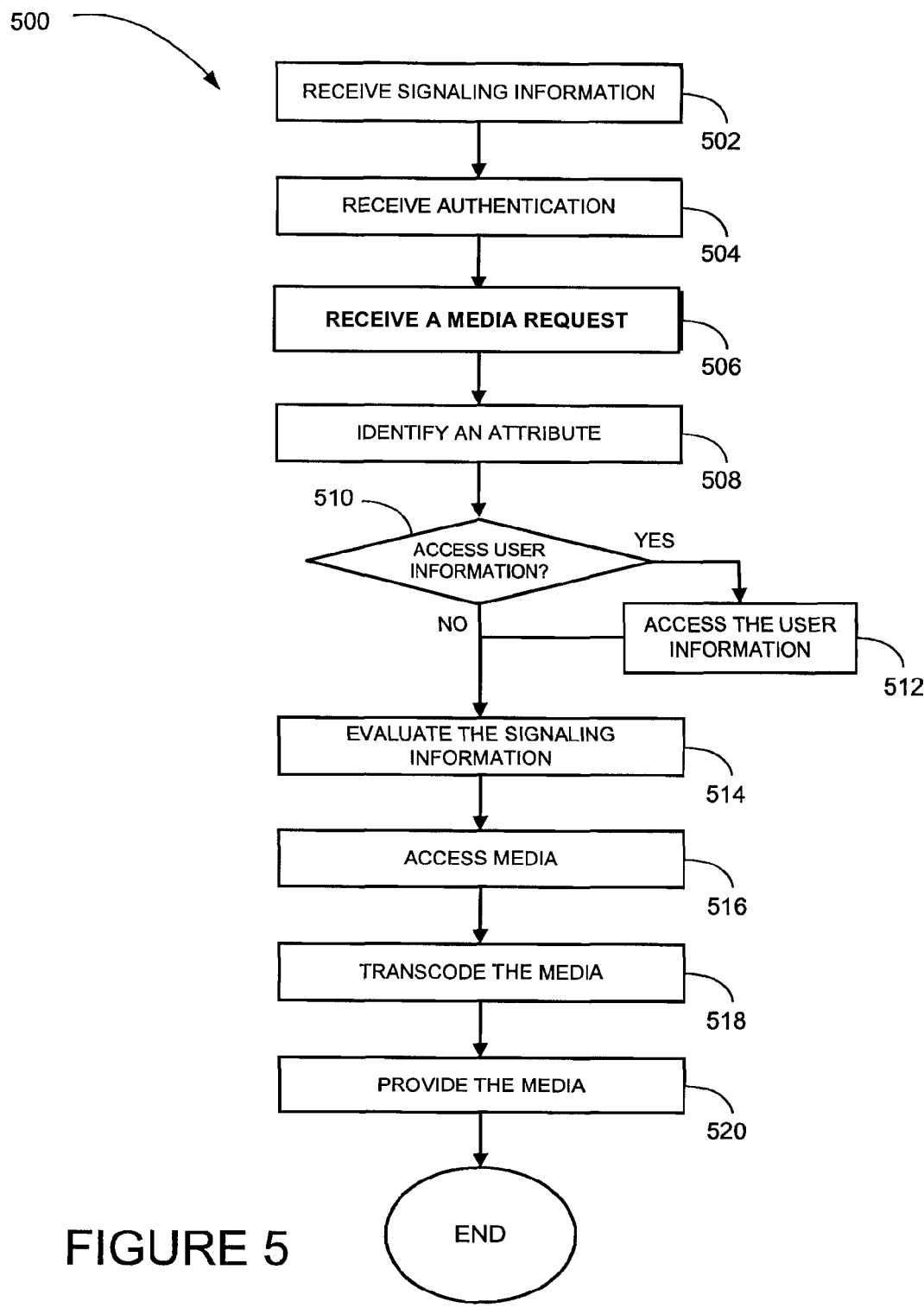

FIG. 5 illustrates a method 500 for providing media according to an example embodiment. The method 500 may be performed by the mediation agent 102 in the media system 100, the media system 200, and/or otherwise performed.

Signaling information is received from the target device 106 and the media server 112 at block 502. The signaling information may be received by monitoring the signaling information between the target device 106 and the media server 112, receiving the signaling information between the target device 106 and the media server 112 from the monitoring device 108, or otherwise received.

A notification of authentication of the target device 106 by the provider server 110 may be received at block 504. A media request is received for the target device 106 at block 506. One or more attributes of the target device 106 and the media server 112 is identified using the signaling information at block 508.

A determination may be made at decision block 510 whether to access user information. If a determination is made to access the user information, the user information may be accessed from the provider server 110 at block 512. If a determination is made not to access the user information at decision block 510 or upon completion of the operations at block 512, the method 500 may proceed to block 514.

At block 514, the one or more attributes of the target device 106 and the media server 112 and optionally the user information are evaluated against a service level objective to select a media format. The service level objective may include consideration of the target device 106 and available bandwidth over the provider network 104.

The media of a source media format may be accessed from the media server 112 at block 516. The media server 112 may include a single media format or a number of available media formats. The media of the source media format may be transcoded at block 518.

The media is provided in the selected media format (e.g., as accessed or as transcoded) over the provider network 104 to the target device 106 at block 520.

Figure 6:
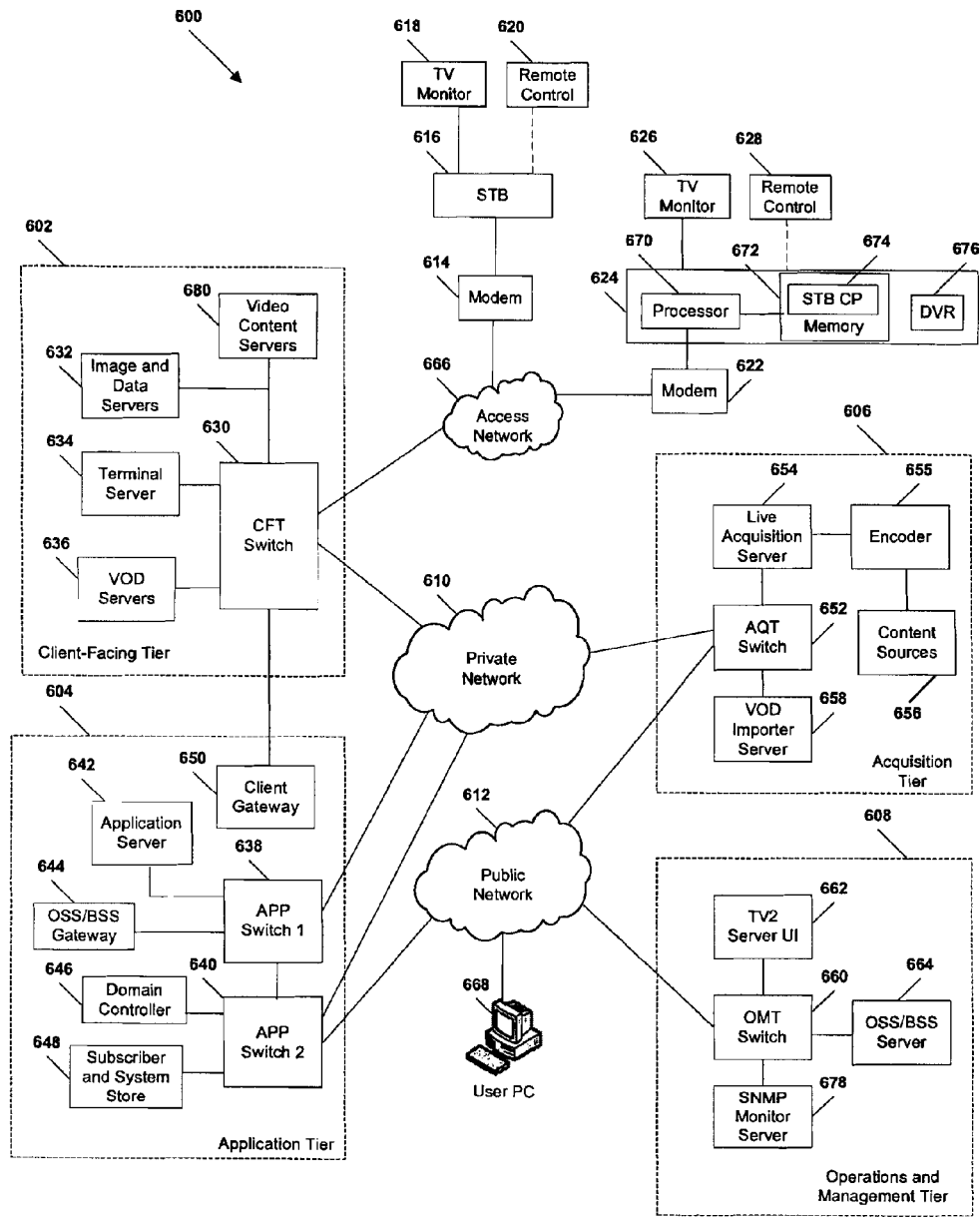
FIG. 6 is a block diagram of an IPTV system in which the media system of FIG. 1 or FIG. 2 may be deployed in accordance with an example embodiment.

FIG. 6 illustrates an example embodiment of an Internet Protocol Television (IPTV) system 600 in which the media system 100 and/or the media system 200 (see FIGS. 1 and 2) may be deployed. However, the media systems 100, 200 may be deployed in other types of IPTV and non-IPTV video systems.

The system 600 as illustrated may include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. For example, the client-facing tier 602 may be coupled to the private network 610. Further, the application tier 604 may be coupled to the private network 610 and to the public network 612. The acquisition tier 606 may also be coupled to the private network 610 and to the public network 612. Additionally, the operations and management tier 608 may be coupled to the public network 612.

As illustrated in FIG. 6, the various tiers 602, 604, 606, 608 communicate with each other via the private network 610 and the public network 612. For instance, the client-facing tier 602 may communicate with the application tier 604 and the acquisition tier 606 via the private network 610. The application tier 604 may also communicate with the acquisition tier 606 via the private network 610. Further, the application tier 604 may communicate with the acquisition tier 606 and the operations and management tier 608 via the public network 612. Moreover, the acquisition tier 606 may communicate with the operations and management tier 608 via the public network 612. In a particular embodiment, elements of the application tier 604, including, but not limited to, a client gateway 650, may communicate directly with the client-facing tier 602.

As illustrated in FIG. 6, the client-facing tier 602 may communicate with user equipment via a private access network 666 (e.g., the provider network 104 of FIG. 1), such as an Internet Protocol Television (IPTV) access network. In an illustrative embodiment, modems, such as a first modem 614 and a second modem 622 may be coupled to the private access network 666. The client-facing tier 602 may communicate with a first representative set-top box device 616 via the first modem 614 and with a second representative set-top box device 624 via the second modem 622. The client-facing tier 602 may communicate with a large number of set-top boxes, such as the representative set-top boxes 616, 624, (e.g., the target device 106 of FIG. 1) over a wide geographic area, such as a regional area, a metropolitan area, a viewing area, a designated market area or any other suitable geographic area, market area, or subscriber or customer group that may be supported by networking the client-facing tier 602 to numerous set-top box devices. In an illustrative embodiment, the client-facing tier, or any portion thereof, may be included at a video head-end office.

In a particular embodiment, the client-facing tier 602 may be coupled to the modems 614, 622 via fiber optic cables. Alternatively, the modems 614 and 622 may be digital subscriber line (DSL) modems that are coupled to one or more network nodes via twisted pairs, and the client-facing tier 602 may be coupled to the network nodes via fiber-optic cables. Each set-top box device 616, 624 may process data received via the private access network 666, via an IPTV software platform, such as Microsoft® TV IPTV Edition. In another embodiment, representative set-top boxes 616, 624 may receive data from private access network 666 through RF and other cable and/or satellite based networks.

Additionally, the first set-top box device 616 may be coupled to a first external display device, such as a first television monitor 618, and the second set-top box device 624 may be coupled to a second external display device, such as a second television monitor 626. Moreover, the first set-top box device 616 may communicate with a first remote control 620, and the second set-top box device may communicate with a second remote control 628.

In an example, non-limiting embodiment, each set-top box device 616, 624 may receive video content, which may include video and audio portions, from the client-facing tier 602 via the private access network 666. The set-top boxes 616, 624 may transmit the video content to an external display device, such as the television monitors 618, 626. Further, the set-top box devices 616, 624 may each include a STB processor, such as STB processor 670, and a STB memory device, such as STB memory 672, which is accessible to the STB processor 670. In one embodiment, a computer program, such as the STB computer program 674, may be embedded within the STB memory device 672. Each set-top box device 616, 624 may also include a video content storage module, such as a digital video recorder (DVR) 676. In a particular embodiment, the set-top box devices 616, 624 may communicate commands received from the remote control devices 620, 628 to the client-facing tier 602 via the private access network 666.

In an illustrative embodiment, the client-facing tier 602 may include a client-facing tier (CFT) switch 630 that manages communication between the client-facing tier 602 and the private access network 666 and between the client-facing tier 602 and the private network 610. As shown, the CFT switch 630 is coupled to one or more image and data servers 632 that store still images associated with programs of various IPTV channels. The image and data servers 632 may also store data related to various channels, e.g., types of data related to the channels and to programs or video content displayed via the channels. In an illustrative embodiment, the image and data servers 632 may be a cluster of servers, each of which may store still images, channel and program-related data, or any combination thereof. The CFT switch 630 may also be coupled to a terminal server 634 that provides terminal devices with a connection point to the private network 610. In a particular embodiment, the CFT switch 630 may also be coupled to one or more video-on-demand (VOD) servers 636 that store or provide VOD content imported by the IPTV system 600. In an illustrative, non-limiting embodiment, the VOD content servers 680 may include one or more unicast servers.

The client-facing tier 602 may also include one or more video content servers 680 that transmit video content requested by viewers via their set-top boxes 616, 624. In an illustrative, non-limiting embodiment, the video content servers 680 may include one or more multicast servers.

As illustrated in FIG. 6, the application tier 604 may communicate with both the private network 610 and the public network 612. The application tier 604 may include a first application tier (APP) switch 638 and a second APP switch 640. In a particular embodiment, the first APP switch 638 may be coupled to the second APP switch 640. The first APP switch 638 may be coupled to an application server 642 and to an OSS/BSS gateway 644. In a particular embodiment, the application server 642 may provide applications to the set-top box devices 616, 624 via the private access network 666, which enable the set-top box devices 616, 624 to provide functions, such as display, messaging, processing of IPTV data and VOD material, etc. In a particular embodiment, the OSS/BSS gateway 644 includes operation systems and support (OSS) data, as well as billing systems and support (BSS) data. In one embodiment, the OSS/BSS gateway may provide or restrict access to an OSS/BSS server 664 that stores operations and billing systems data.

Further, the second APP switch 640 may be coupled to a domain controller 646 that provides web access, for example, to users via the public network 612. For example, the domain controller 646 may provide remote web access to IPTV account information via the public network 612, which users may access using their personal computers 668. The second APP switch 640 may be coupled to a subscriber and system store 648 that includes account information, such as account information that is associated with users who access the system 600 via the private network 610 or the public network 612. In a particular embodiment, the application tier 604 may also include a client gateway 650 that communicates data directly with the client-facing tier 602. In this embodiment, the client gateway 650 may be coupled directly to the CFT switch 630. The client gateway 650 may provide user access to the private network 610 and the tiers coupled thereto.

In a particular embodiment, the set-top box devices 616, 624 may access the IPTV system 600 via the private access network 666, using information received from the client gateway 650. In this embodiment, the private access network 666 may provide security for the private network 610. User devices may access the client gateway 650 via the private access network 666, and the client gateway 650 may allow such devices to access the private network 610 once the devices are authenticated or verified. Similarly, the client gateway 650 may prevent unauthorized devices, such as hacker computers or stolen set-top box devices from accessing the private network 610, by denying access to these devices beyond the private access network 666.

For example, when the first representative set-top box device 616 accesses the system 600 via the private access network 666, the client gateway 650 may verify subscriber information by communicating with the subscriber and system store 648 via the private network 610, the first APP switch 638, and the second APP switch 640. Further, the client gateway 650 may verify billing information and status by communicating with the OSS/BSS gateway 644 via the private network 610 and the first APP switch 638. In one embodiment, the OSS/BSS gateway 644 may transmit a query across the first APP switch 638, to the second APP switch 640, and the second APP switch 640 may communicate the query across the public network 612 to the OSS/BSS server 664. After the client gateway 650 confirms subscriber and/or billing information, the client gateway 650 may allow the set-top box device 616 access to IPTV content and VOD content. If the client gateway 650 is unable to verify subscriber information for the set-top box device 616, e.g., because it is connected to an unauthorized twisted pair, the client gateway 650 may block transmissions to and from the set-top box device 616 beyond the private access network 666.

As indicated in FIG. 6, the acquisition tier 606 includes an acquisition tier (AQT) switch 652 that communicates with the private network 610. The AQT switch 652 may also communicate with the operations and management tier 608 via the public network 612. In a particular embodiment, the AQT switch 652 may be coupled to a live acquisition server 654 that receives television or movie content, for example, from content sources 656 through an encoder 655. In a particular embodiment during operation of the IPTV system, the live acquisition server 654 may acquire television or movie content. The live acquisition server 654 may transmit the television or movie content to the AQT switch 652 and the AQT switch 652 may transmit the television or movie content to the CFT switch 630 via the private network 610.

Further, the television or movie content may be transmitted to the video content servers 680, where it may be encoded, formatted, stored, or otherwise manipulated and prepared for communication to the set-top box devices 616, 624. The CFT switch 630 may communicate the television or movie content to the modems 614, 622 via the private access network 666. The set-top box devices 616, 624 may receive the television or movie content via the modems 614, 622, and may transmit the television or movie content to the television monitors 618, 626. In an illustrative embodiment, video or audio portions of the television or movie content may be streamed to the set-top box devices 616, 624.

Further, the AQT switch may be coupled to a video-on-demand importer server 658 that stores television or movie content received at the acquisition tier 606 and communicates the stored content to the VOD server 636 at the client-facing tier 602 via the private network 610. Additionally, at the acquisition tier 606, the video-on-demand (VOD) importer server 658 may receive content from one or more VOD sources outside the IPTV system 600, such as movie studios and programmers of non-live content. The VOD importer server 658 may transmit the VOD content to the AQT switch 652, and the AQT switch 652, in turn, may communicate the material to the CFT switch 630 via the private network 610. The VOD content may be stored at one or more servers, such as the VOD server 636.

When user issue requests for VOD content via the set-top box devices 616, 624, the requests may be transmitted over the private access network 666 to the VOD server 636, via the CFT switch 630. Upon receiving such requests, the VOD server 636 may retrieve the requested VOD content and transmit the content to the set-top box devices 616, 624 across the private access network 666, via the CFT switch 630. The set-top box devices 616, 624 may transmit the VOD content to the television monitors 618, 626. In an illustrative embodiment, video or audio portions of VOD content may be streamed to the set-top box devices 616, 624.

FIG. 6 further illustrates that the operations and management tier 608 may include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 may be coupled to an OSS/BSS server 664 and to a simple network management protocol (SNMP) monitor 678 that monitors network devices within or coupled to the IPTV system 600. In a particular embodiment, the OMT switch 660 may communicate with the AQT switch 652 via the public network 612.

In an illustrative embodiment, the live acquisition server 654 may transmit the television or movie content to the AQT switch 652, and the AQT switch 652, in turn, may transmit the television or movie content to the OMT switch 660 via the public network 612. In this embodiment, the OMT switch 660 may transmit the television or movie content to the TV2 server 662 for display to users accessing the user interface at the TV2 server 662. For example, a user may access the TV2 server 662 using a personal computer (PC) 668 coupled to the public network 612.

Figure 7:
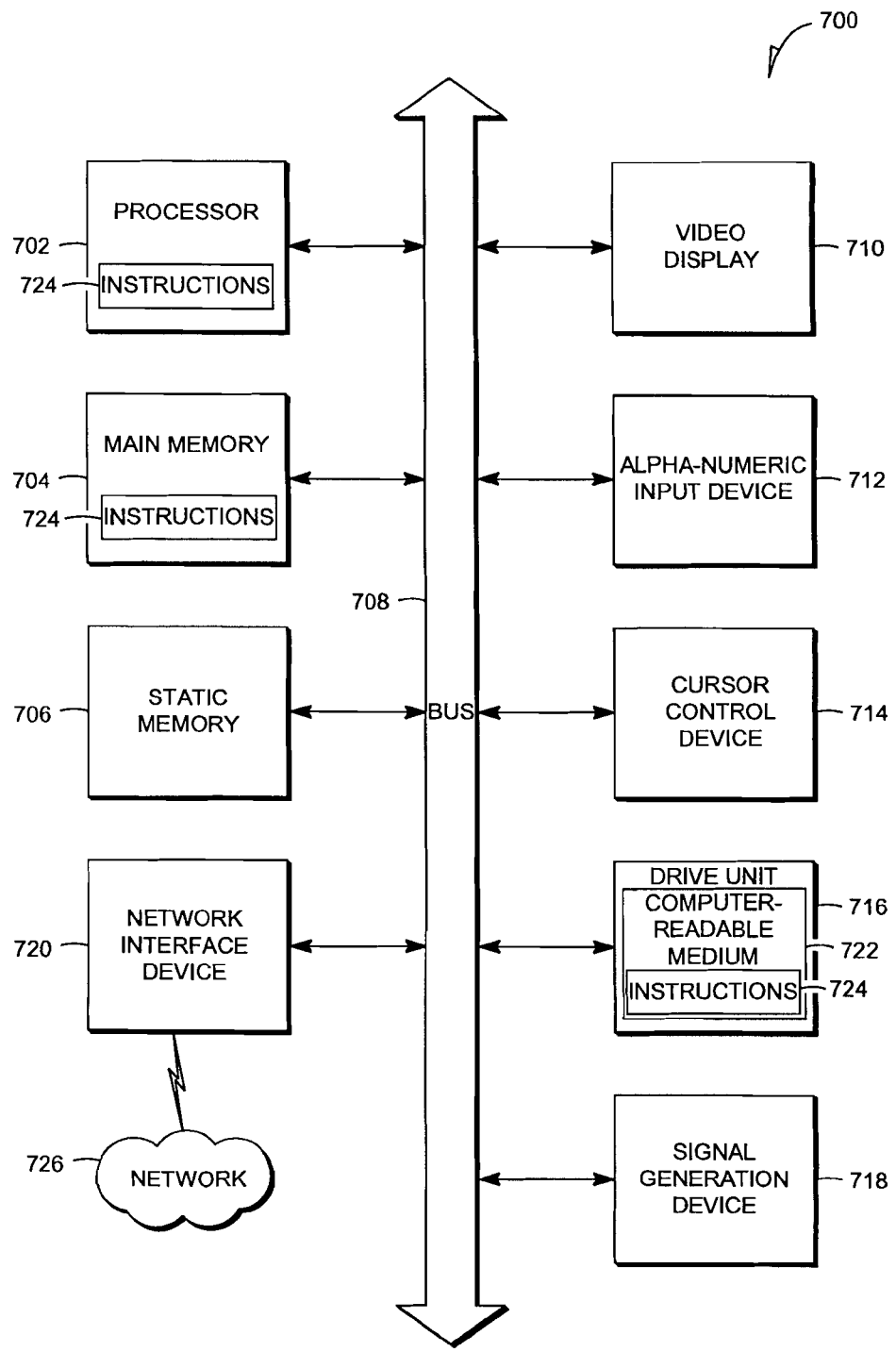
FIG. 7 illustrates a diagrammatic representation of machine in the example form of a computer system within which a set of instructions for causing the machine to perform any one or more of the methodologies discussed herein may be executed.

FIG. 7 shows a diagrammatic representation of machine in the example form of a computer system 700 within which a set of instructions may be executed causing the machine to perform any one or more of the methods, processes, operations, or methodologies discussed herein. The provider servers 110 and the media servers 112 may operate on or more computer systems 700 and/or the mediation agent 102, the target device 106, and/or the monitoring device 108 may include the functionality of the computer system 700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a drive unit 716, a signal generation device 718 (e.g., a speaker) and a network interface device 720.

The drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for media adaptation have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   receiving, by a mediation agent device comprising a processing system including a processor and configured to receive signaling information exchanged between a target device and a media server, a media request from the target device, the target device being one of a plurality of target device types associated with the media server through the mediation agent device;
   receiving, by the mediation agent device, the signaling information exchanged between the target device and the media server, wherein the signaling information comprises a media resolution used by the target device for presenting media content, and a packet impairment characteristic for delivering media content from the media server over a provider network;
   identifying, by the mediation agent device, a first attribute of the target device according to the signaling information and a second attribute of the media server according to the signaling information, wherein the first attribute is a decoding capability of the target device;
   evaluating, by the mediation agent device, the first attribute of the target device and the second attribute of the media server against a service level objective, wherein the service level objective includes presenting the media content at the target device within a predetermined time period at a presentation quality at the target device that conforms to the media resolution used by the target device;
   selecting a media format for delivering media content to the target device according to the evaluation;
   transcoding, by the mediation agent device, the media content from the media server into the media format; and
   providing, by the mediation agent device, the media content in the media format over the provider network to the target device.

2. The method of claim 1, wherein the receiving of the media request comprises receiving, by the mediation agent device, a notification of authentication of the target device by a provider server.

3. The method of claim 1, wherein the receiving of the signaling information comprises initiating, by the mediation agent device, an exchange of the signaling information between the target device and the media server.

4. The method of claim 1, wherein the evaluating of the signaling information further comprises transcoding, by the mediation agent device, the media content to the media format.

5. The method of claim 1, wherein the target device comprises a set-top box.

6. The method of claim 1, wherein the evaluating of the first attribute and the second attribute further comprises accessing, by the mediation agent device, user information related to the media format from a provider server; and evaluating the user information and the signaling information from the target device and the media server against the service level objective to select the media format.

7. The method of claim 6, wherein the user information includes an ordering history based on user input and one of a viewing history, a user preference of the media format, or a combination thereof.

8. The method of claim 1, wherein the media content comprises video content.

9. The method of claim 1, wherein the first attribute of the target device further comprise one of a feature of the target device, a decoding capability of the target device, an available resource of the target device, a cost of delivery of the media content to the target device, a time of delivery of the media content to the target device, a subscriber history of a user associated with the target device, available bandwidth on a provider network to the target device, or a combination thereof.

10. The method of claim 1, wherein the second attribute of the media server further comprises an available bandwidth on the provider network from the media server.

11. A non-transitory, machine-readable storage medium, comprising executable instructions that, when executed by a processing system including a processor, facilitate performance of operations, comprising:
   exchanging signaling information between a target device and a media server, the target device being one of a plurality of target device types associated with the media server, wherein the signaling information comprises a media resolution used by the target device for presenting media content and a packet impairment characteristic for delivering media content over a provider network;
   receiving a media request from the target device;
   identifying a first attribute of the target device and a second attribute of the media server according to the signaling information, wherein the first attribute is a decoding capability of the target device;
   evaluating the first attribute of the target device and second attribute of the media server against a service level objective, wherein the service level objective includes a consideration of presenting the media over the provider network within a predetermined time period at a presentation quality at the target device that conforms to the media resolution used by the target device;
   receiving a selected media format for delivering media content to the target device according to the evaluation;
   presenting a request for the selected media format to the media server;
   receiving transcoded media content in the media format from the media server, wherein the media server transcodes the media content into the selected media format as the transcoded media content; and
   providing the transcoded media content in the selected media format to the target device.

12. The non-transitory, machine-readable storage medium of claim 11, wherein the operations further comprise monitoring the signaling information between the target device and the media server.

13. The non-transitory, machine-readable storage medium of claim 11, wherein receiving the signaling information comprises receiving the signaling information from a monitoring device.

14. The non-transitory, machine-readable storage medium of claim 11, wherein evaluating the first attribute of the target device and the second attribute of the media server comprises accessing user information related to the media format from a provider server; and evaluating the user information and the signaling information from the target device and the media server against the service level objective to select the media format.

15. A system, comprising:
   a processing system including a processor; and
   a memory that stores executable instructions that, when executed by the processing system, facilitate performance of operations, comprising:
      receiving a media request from a target device, the target device being one of a plurality of target device types;
      exchanging signaling information between the target device and a media server, wherein the signaling information comprises a media resolution used by the target device for presenting media content, and a packet impairment characteristic for delivering media content from the media server over a provider network;
      identifying a first attribute of the target device and a second attribute of the media server using the signaling information, wherein the first attribute is a decoding capability of the target device;
      evaluating the first attribute of the target device and the second attribute of the media server against a service level objective, wherein the service level objective includes a consideration of receiving media content over the provider network within a predetermined time period at a presentation quality at the target device that conforms to the media resolution used by the target device;
      selecting a media format for delivering media content to the target device according to the evaluation;
      requesting the media content from the media server in the media format;
      receiving transcoded media content in the media format from the media server over the provider network, wherein the media server transcodes the media content into the media format as the transcoded media content; and
      providing the transcoded media content over the provider network to the target device.

16. The system of claim 15, wherein the operations further comprise receiving a notification of authentication of the target device by a provider server.

17. The system of claim 15, wherein the operations further comprise transcoding the media content to the media format.

18. The system of claim 15, wherein the operations further comprise accessing user information related to the media format from a provider server.

19. The system of claim 15, wherein the operations further comprise initiating an exchange of the signaling information between the target device and the media server.

20. The system of claim 15, wherein the predetermined time period is a guaranteed period of time.

* * * * *